US 6,561,080 B1

(12) United States Patent
Feeney

(10) Patent No.: US 6,561,080 B1
(45) Date of Patent: May 13, 2003

(54) SCREW PRESS COFFEE BREWING APPARATUS

(76) Inventor: James E. Feeney, 7995 Cinnabar Dr., La Mesa, CA (US) 91941

( * ) Notice: Subject to any disclaimer, the term of this patent is extended or adjusted under 35 U.S.C. 154(b) by 0 days.

(21) Appl. No.: 10/011,389

(22) Filed: Dec. 4, 2001

(51) Int. Cl.⁷ .................................................. A47J 31/18
(52) U.S. Cl. .............................. 99/319; 99/323; 99/295
(58) Field of Search .......................... 99/319, 318, 317, 99/316, 323, 323.3, 295, 297; 219/689

(56) References Cited

U.S. PATENT DOCUMENTS

| 881,562 A | * | 3/1908 | Ellis ............................. 99/319 |
| 2,741,174 A | * | 4/1956 | Casey .......................... 99/283 |
| 5,880,441 A | * | 3/1999 | Hartman et al. ............ 219/689 |

* cited by examiner

Primary Examiner—Reginald L. Alexander
(74) Attorney, Agent, or Firm—Charles C. Logan, II

(57) ABSTRACT

A one-cup coffee brewing apparatus having a hot water container member unit and a drinking vessel unit. The hot water container member has a tubular side wall having an open top end and a closed bottom end to form a hot water chamber. The drinking vessel unit has a cup member having an inner tubular side wall which has an open top end and a bottom end closed by a water permeable member. A coffee grounds holder is removably secured to the bottom end of the tubular side wall of the cup member and it has a chamber therein for receiving coffee grounds. The bottom wall of the coffee grounds holder unit has a water permeable member. There is structure on the outer surface of the cup member adjacent its top end that mates with structure adjacent the top end of the hot water container member unit that allows the cup member unit to be screwed down into the hot water chamber of the unit thereby forcing hot water therein to pass upwardly through the coffee grounds holder to produce a fresh brewed cup of coffee in the cup member.

19 Claims, 2 Drawing Sheets

SCREW PRESS COFFEE BREWING APPARATUS

BACKGROUND OF THE INVENTION

The present invention relates to a unique screw coffee filtration system and more specifically to a one-cup coffee brewing device.

It is well known in the art of coffee making to prepare hot coffee by passing water, usually at just below boiling temperature, through coffee grounds which are prevented from passage with the water by a filter which is a water permeable paper membrane; brewing coffee, by gravity passes in a drip fashion downwardly through the coffee grounds into a container placed thereunder. One example of such a prior art apparatus is illustrated in the Hayes U.S. Pat. No. 4,520,716. Another one-cup coffee brewing device that utilizes a drip method is the Hunnicutt, Jr. U.S. Pat. No. 4,986,172.

The Fuchs, Jr. U.S. Pat. No. 5,095,185 is directed to a microwave coffee maker for brewing a single cup of coffee that allows for controlling the time for the extraction process of the coffee from the coffee grounds.

The Piazza U.S. Pat. No. 5,586,484 is directed to an inexpensive espresso coffee maker as opposed to an expensive commercial machine.

It is an object of the invention to provide a novel coffee brewing device capable of quickly producing a single insulated cup of brewed coffee.

It is also an object of the invention to provide a novel coffee brewing device that produces a single cup of coffee much in the manner of an espresso machine. Whereas a standard expresso machine utilizes an electric water pump to force hot water through coffee grounds and then a filter membrane, this unique apparatus utilizes mechanical pressure created by a threaded screw press to force hot water through coffee grounds and then a filter membrane.

It is another object of the invention to provide a novel coffee brewing apparatus that is economical to manufacture and market.

It is an additional object of the invention to provide a novel coffee brewing apparatus that is easily operated and easy to clean.

It is a further object of the invention to provide a novel coffee brewing apparatus that also functions as a triple wall air space sealed insulated cup for drinking the brewed coffee.

SUMMARY OF THE INVENTION

The one-cup coffee brewing apparatus has three major components. They are the hot water container member, the drinking vessel unit, and the coffee grounds holder unit. Initially a predetermined amount of coffee grounds would be spooned into the coffee grounds holder unit and it would be screwed onto the bottom end of the drinking vessel unit. Concurrently, the hot water container member would have been filled to a proper height with water and placed in a microwave oven for the proper amount of time to produce heated water in the range of the boiling temperature. Next the drinking vessel unit would be placed above the hot water container member, pushed down and thereby lowered therein a sufficient distance until the external threads on the inner tubular side wall of the drinking vessel unit contact the internal threads or grooves adjacent the top end of the inner surface of the tubular side wall of the hot water container member. Upon initial insertion of the drinking vessel unit into the hot water container member, an air-tight hermetic seal providing insulation and preventing leakage between the cup member and the tubular insulation member is established through an O-ring mounted on the outer tubular wall of the hot water container member. As the drinking vessel unit is pushed down into the hot water container member, the hot water will be forced upwardly through the water permeable member in the bottom of the coffee grounds holder unit, through the coffee grounds and upwardly out through the upper water permeable member into the interior of the cup member of the drinking vessel unit. When the drinking vessel unit external threads meet the hot water container member internal threads, the handle on the drinking vessel unit would be gripped and rotated thereby screwing the cup member of the drinking vessel unit downwardly into the hot water container member in the manner of a power screw creating pressure that will continue to force the hot water upwardly through the coffee grounds holder unit to produce a single cup of coffee in the interior of the cup member of the drinking vessel unit. By utilizing a power screw press, coffee is brewed at an optimum temperature in less than one minute.

The coffee brewing apparatus also functions as an insulated cup for drinking the brewed coffee. It also allows a person to carry the cup of brewed coffee with them immediately as they leave the house on their way to work.

DESCRIPTION OF THE PREFERRED EMBODIMENT

Figure 1:
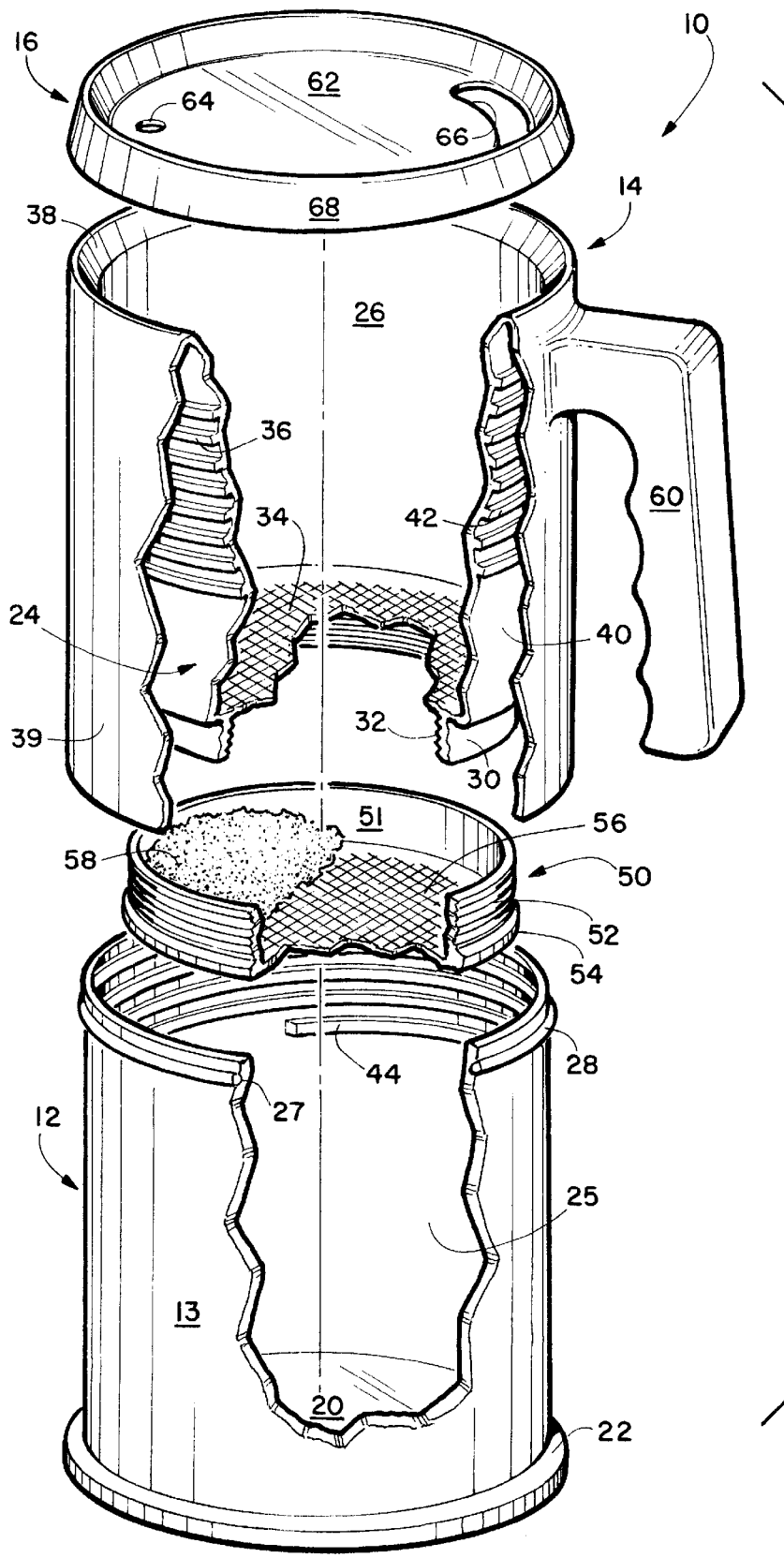
FIG. 1 is an exploded front perspective view of the one-cup coffee brewing apparatus with portions broken away for clarity.
Figure 2:
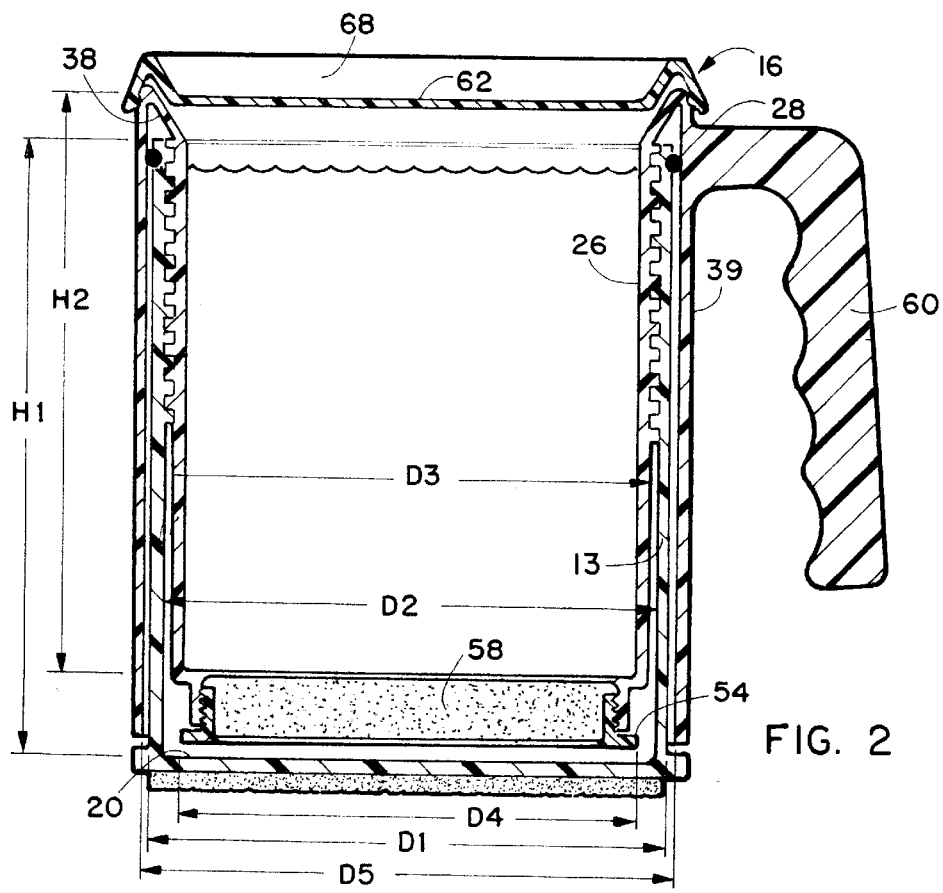
FIG. 2 is a vertical cross sectional view of the one-cup coffee brewing apparatus as assembled.
Figure 3:
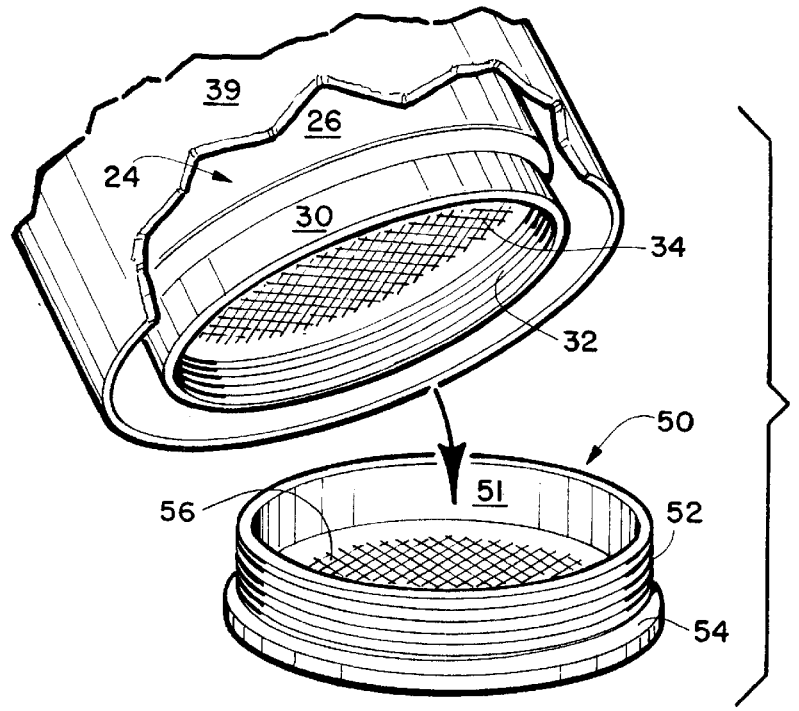
FIG. 3 is an exploded front perspective of the coffee grounds holder and the bottom end of the cup member.

The novel coffee brewing apparatus will now be described by referring to FIGS. 1–3 of the drawings. The coffee brewing apparatus is generally designated numeral 10. It has an open top hot water container member 12, a drinking vessel unit 14 and a lid or cover 16.

Hot water container 12 has a tubular side wall having an open top end and its bottom end is closed by bottom wall 20. Bottom wall 20 has an annular flange 22 whose function will be discussed later. The interior of tubular side wall 13 forms a hot water chamber 25. An annular groove 27 is formed adjacent the top end of tubular side wall 13 and it receives an O-ring 28 therein. The inner surface of tubular side wall 13 has threads 44 extending radially inward therefrom and these may be square, acme or any other type of thread that would perform the intended function. Hot water container member 12 has a height H1 in the range of 4"–8". Tubular side wall 13 has an inner diameter D2.

Drinking vessel unit 14 has a cup member 24 having a tubular side wall 26 having an outer diameter D3 and D3 is less than D2. A reduced diameter annular neck portion 30 is formed adjacent the bottom end of tubular side wall 26. Internal grooves 32 are formed on the inner surface of annular neck portion 30. An upper water permeable member 34 may be integrally formed with tubular side wall 26 or may be formed as a separate member that is removable and lockable therein by appropriate structure. External threads 36 are formed on the outer surface of tubular side wall 26 of cup member 24 adjacent its top end. An annular inverted V-shaped lip 38 has its one edge connected to the top end of tubular side wall 26 and its other edge connected to the top edge of tubular insulation wall 39. An annular chamber 40 is formed between tubular side wall 26 of cup members 24 and tubular insulation wall 39. External threads 42 are formed on the outer surface of tubular side wall 26 and they threadably mate with the internal threads 44 on the inner surface of tubular wall 13 of hot water container member 12 adjacent its top end. The inner surface of tubular insulation wall 39 is smooth (see FIG. 2) and O-ring 28 forms a seal which prevents water from traveling between the outer surface of the tubular side wall 26 of cup member 24 and the inner surface of tubular side wall 13 and then downwardly between the inner surface of tubular insulation wall 39 and the outer surface of tubular side wall 13.

Coffee grounds holder unit 50 has a tubular side wall 51 having an open top end. It has external threads 52 extending radially outwardly from its outer surface that are threadably received in the internal grooves 32 of annular neck portion 30. An annular flange 54 extends radially outwardly from the bottom edge of tubular side wall 51 and provides a stop against further rotation into annular neck portion 30. A lower water permeable member 56 closes the bottom end of tubular side wall 51. Coffee grounds 58 are illustrated in the interior of coffee grounds holder unit 50. A handle 60 is attached to the outer surface of tubular insulation wall 39. The lid or cover 16 has a disc portion 62, an air relief aperture 64, a drinking aperture 66 and an outer annular wall 68.

The coffee brewing apparatus 10 has been designed to quickly and easily produce one cup of brewed coffee. Initially water in hot water container member 12 is heated in a microwave oven almost to the boiling point. A predetermined amount of coffee grounds is spooned into the interior of coffee grounds holder unit 50 and it would be threaded onto the bottom end of tubular side wall 26 of the cup member 24. Next the drinking vessel unit would be positioned so that the cup member 24 can be telescopically pushed downwardly into the interior of tubular side wall 13 of hot water container member 12 thus allowing the hot water to be forced upwardly through the coffee grounds 58. As the bottom end of external threads 36 reach the internal grooves 44, handle 60 would be gripped and the drinking vessel unit 14 would be rotated a couple of turns and threaded downward with respect to hot water container member 12 creating pressure to force any remaining hot water in the lower part of hot water chamber 25 upwardly through the coffee grounds holder unit 50. Any water which has traveled upwardly through annular chamber 40 past the threads 42 and internal grooves 44 would be stopped by the O-ring 28 thereby preventing any of the hot water from leaking downwardly between the inner surface of tubular outer insulation wall 39 and tubular side wall 13. The bottom edge of tubular insulation wall 39 will abut the top surface of annular flange 22 to seal an annular column of air between the outer surface of tubular wall 13 and the inner surface of tubular insulation wall 39 to produce a layer of insulation. A quick cup of hot brewed coffee is thus easily made at optimum temperature in under a minute of time.

I claim:
1. A coffee brewing apparatus comprising:
a hot water container member having a primary tubular side wall having an open top end, a bottom end, an outer surface, an inner surface, a height H1, an outer diameter D1 and an inner diameter D2; a bottom wall is connected to said bottom end of said primary tubular side wall to form a hot water chamber;
a cup member having a secondary tubular side wall having a top end, a bottom end, an outer surface, an inner surface, a height H2 and an outer diameter D3;
means for holding coffee grounds having a first tubular side wall having a top end, a bottom end, an outer surface, an inner surface and an outer diameter D4 and D4 is less than D2; said means for holding coffee grounds having an upper water permeable member that closes said top end of said first tubular side wall; said means for holding coffee grounds also having a lower water permeable member that closes said bottom end of said first tubular side wall; said vertically spaced upper and lower water permeable members form a chamber for receiving coffee grounds;
said means for holding coffee grounds positioned adjacent said bottom end of said cup member when said secondary tubular side wall is inserted into said hot water container member; and
means for screwing said cup member into said hot water container member thereby forcing hot water in said hot water container member to pass upwardly through said means for holding coffee grounds to produce a fresh brewed cup of coffee in said cup member; said means for screwing said cup member into said hot water container member comprises internal threaded grooves on said inner surface of said primary tubular inner wall and external threads on said outer surface of said secondary tubular inner wall.

2. A coffee brewing apparatus as recited in claim 1 further comprising sealing means for preventing hot water from leaking upwardly from between said outer surface of said secondary tubular side wall and said inner surface of said primary tubular side wall.

3. A coffee brewing apparatus as recited in claim 2 wherein said sealing means comprises an O-ring positioned adjacent said top end of said primary tubular side wall.

4. A coffee brewing apparatus as recited in claim 3 wherein said sealing means further comprises said cup member having a tubular insulating side wall having a top end, a bottom end, an outer surface, an inner surface, and an inner diameter D5 and D5 is greater than D1; said top ends of said respective secondary tubular side wall and said tubular insulating side wall being connected together by an annular lip member to close said respective top ends of said secondary tubular side walls and said tubular insulating side wall.

5. A coffee brewing apparatus as recited in claim 4 further comprising stop means adjacent said bottom end of said primary tubular side wall for limiting downward travel of said tubular insulating side wall as it telescopes downwardly over said primary tubular side wall.

6. A coffee brewing apparatus as recited in claim 5 wherein said stop means is an annular flange extending outwardly from said primary tubular side wall.

7. A coffee brewing apparatus as recited in claim 1 further comprising a handle attached to said coffee brewing apparatus.

8. A coffee brewing apparatus as recited in claim 1 wherein said respective internal threaded grooves and said external threads are positioned adjacent said top ends of said respective primary tubular side wall and said secondary tubular inner wall.

9. A coffee brewing apparatus as recited in claim 8 further comprising sealing means for preventing hot water from leaking upwardly between said outer surface of said secondary tubular side wall and said inner surface of said primary tubular side wall.

10. A coffee brewing apparatus as recited in claim 9 wherein said sealing means comprises said cup member having an outer tubular insulating side wall having a top end, a bottom end, an outer surface, an inner surface and an inner diameter D5 and D5 is greater than D1; said top ends of said respective secondary tubular side wall and said outer tubular insulating side wall being connected together by an annular lip member to close said respective top ends of said secondary tubular side walls and said tubular insulating side wall; an annular groove in said outer surface of said primary tubular side wall and an O-ring is seated in said annular groove.

11. A coffee brewing apparatus as recited in claim 1 further comprising attachment means for securing said means for holding coffee grounds to said bottom end of said secondary tubular wall of said cup member.

12. A coffee brewing apparatus as recited in claim 11 wherein said attachment means comprises said tubular secondary wall having an annular neck formed adjacent said bottom end of said secondary tubular inner wall and said annular neck has an inner surface with internal threaded grooves formed therein.

13. A coffee brewing apparatus as recited in claim 12 wherein said attachment means further comprises said outer surface of said first tubular side wall having external threads formed thereon.

14. A coffee brewing apparatus as recited in claim 1 wherein said water permeable members are screens.

15. A coffee brewing apparatus as recited in claim 1 wherein said water permeable members are filters.

16. A coffee brewing apparatus as recited in claim 1 wherein said water permeable members are membranes.

17. A coffee brewing apparatus as recited in claim 16 wherein H1 is in the range of 4"–8".

18. A coffee brewing apparatus as recited in claim 1 wherein D1 is in the range of 3"–5".

19. A coffee brewing apparatus comprising:

a hot water container member having a primary tubular side wall having an open top end, a bottom end, an outer surface, an inner surface, a height H1, an outer diameter D1 and an inner diameter D2; a bottom wall is connected to said bottom end of said primary tubular side wall to form a hot water chamber;

a cup member having a secondary tubular side wall having a top end, a bottom end, an outer surface, an inner surface, a height H2 and an outer diameter D3;

means for holding coffee grounds having a first tubular side wall having a top end, a bottom end, an outer surface, an inner surface and an outer diameter D4 and D4 is less than D2; said means for holding coffee grounds having an upper water permeable member that closes said top end of said first tubular side wall; said means for holding coffee grounds also having a lower water permeable member that closes said bottom end of said first tubular side wall; said vertically spaced upper and lower water permeable members form a chamber for receiving coffee grounds;

said means for holding coffee grounds positioned adjacent said bottom end of said cup member when said secondary tubular side wall is inserted into said hot water container member; and thread means for screwing said cup member into said hot water container member thereby forcing hot water in said hot water container member to pass upwardly through said means for holding coffee grounds and upwardly through coffee grounds to produce a fresh brewed cup of coffee in said cup member.

* * * * *